May 18, 1965   J. L. WINGE ETAL   3,184,008
AUTOMATIC ADJUSTER FOR NON-SERVO BRAKE
Filed May 15, 1963   2 Sheets-Sheet 1
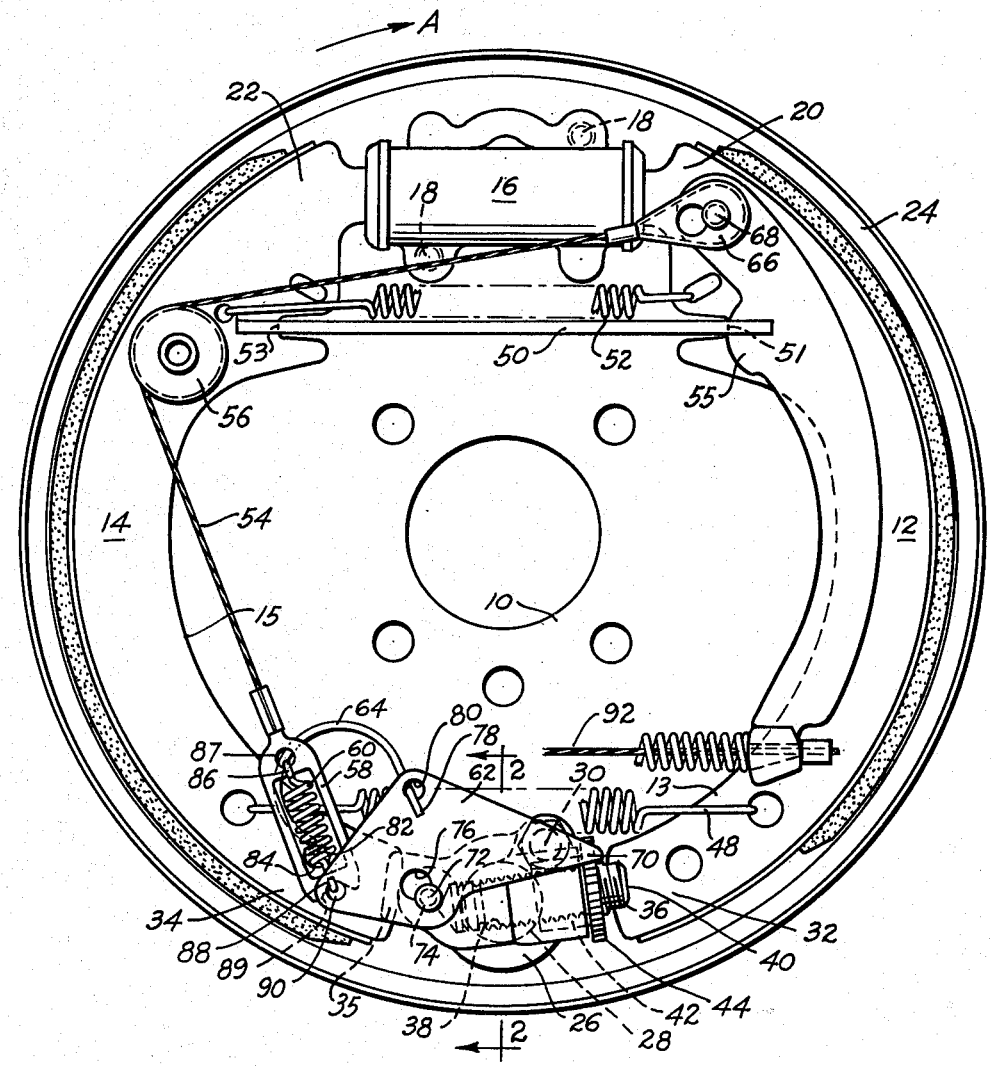
FIG_1
FIG_2
INVENTORS.
JOHN L. WINGE
EDWARD K. DOMBECK.
BY
ATTORNEY.

May 18, 1965 J. L. WINGE ETAL 3,184,008
AUTOMATIC ADJUSTER FOR NON-SERVO BRAKE
Filed May 15, 1963 2 Sheets-Sheet 2
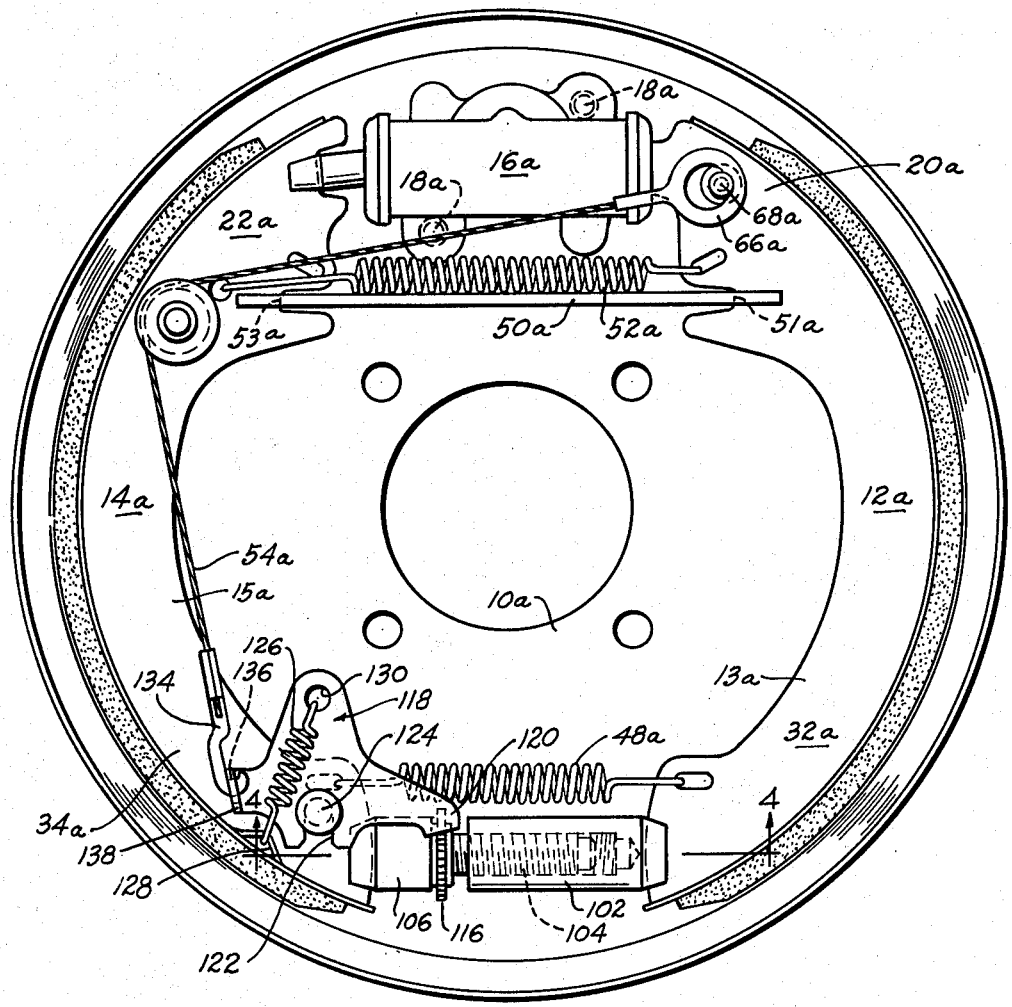
FIG_3
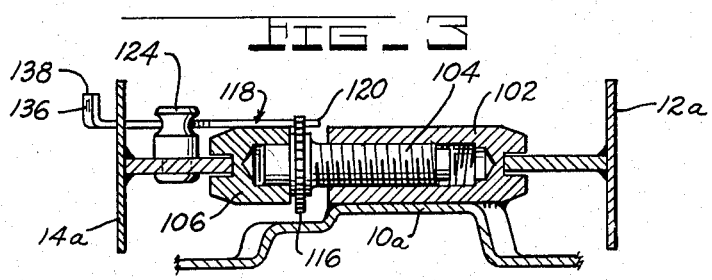
FIG_4
INVENTORS.
JOHN L. WINGE.
EDWARD K. DOMBECK.
BY
Sheldon F. Rayes
ATTORNEY.

United States Patent Office 3,184,008
Patented May 18, 1965

3,184,008
AUTOMATIC ADJUSTER FOR NON-SERVO BRAKE
John L. Winge and Edward K. Dombeck, South Bend, Ind., assignors to The Bendix Corporation, South Bend, Ind., a corporation of Delaware
Filed May 15, 1963, Ser. No. 280,659
10 Claims. (Cl. 188—79.5)

This invention relates to an automatic adjuster for a drum brake.

An object of this invention is to provide a drum brake which has no servo action with an automatic adjuster for adjusting the position of the brake shoes relative to the drum to compensate for wear of the brake linings on the shoes.

Other objects of the invention will become apparent from the following description with reference to the drawings wherein:

FIGURE 1 is a front elevational view of a brake assembly;

FIGURE 2 is a view taken along section line 2—2 of FIG. 1;

FIGURE 3 is a view of the same type of brake assembly as FIG. 1 illustrating a modified adjusting mechanism; and FIGURE 4 is a view taken along section line 4—4 of FIG. 3.

Referring to FIG. 1, the brake assembly illustrated therein comprises a backing plate 10 having a pair of brake shoes 12 and 14 slidably mounted thereon. A fluid motor or wheel cylinder 16 is located between ends 20 and 22 of the brake shoes 12 and 14, respectively, and is mounted to the backing plate 10 by bolts 18. A pair of oppositely acting pistons (not shown) is located within the wheel cylinder 16 for operating on the ends 20 and 22 of the brake shoes to spread the same into engagement with a brake drum 24. An anchor block 26 is located between the adjacent ends 32 and 34 of the brake shoes 12 and 14, respectively, and has a portion 27 extending through the opening 28 in the backing plate and turned under the backing plate which portion 27 and a bolt 30 fixedly secure the anchor block 26 to the backing plate. A slot 35 is provided in the anchor block for receiving the web 15 of the brake shoe 14. A threaded non-rotatable adjusting screw 36 has an inner portion slidably received within a counterbored opening 38 of the anchor block 26 and contains a slot 40 at its outer end to receive the web 13 of the brake shoe 12 therein. An internally threaded sleeve 42 is rotatably received within the opening 38 and has integral therewith, a wheel 44. A spring 48 interconnects the shoe ends 34 and 32 for retaining the same in engagement with the anchor block 26 and adjusting screw 36, respectively.

A rigid strut 50 has a pair of slots 51, 53, one at each end thereof for receiving a respective one of the shoe webs 13 and 15 of the brake shoes 12 and 14. The slot 51 also slidably receives a portion of a parting brake lever 55 pivotally mounted on the web 13 of the brake shoe 12. A shoe return spring 52, connected at each end to a respective one of the shoes, serves to bias the webs of the shoes into anchoring engagement with the rigid strut 50 upon release of the brake.

An automatic adjusting mechanism is provided for actuating the serrated wheel 44 and comprises a cable 54, a pulley 56, a cage member 58, an over-travel spring 60, a lever 62, and a lever return spring 64. A metal retainer 66 is connected to one end of the cable 54 and fastens the cable to a pin 68 extending from and fixed to the web 13 of the shoe 12. The cable 54 is slidably guided intermediate its ends on the pulley 56 and has the cage member 58 attached to its other end. A finger 70 of the lever 62 is positioned adjacent the serrated wheel 44 and is adapted to rotate the same upon clockwise movement of the lever 62. The lever 62 pivots about a pin 72 which extends axially from the anchor block 26 and which has a groove 74 on which the edge of the elongated opening 76 bears. The return spring 64 has one end 78 extending through an opening 80 of the lever 62 and its other end 82 extending through an opening 84 of the brake shoe 14. The return spring 64 is so constructed and the ends thereof placed in their respective openings in such a way as to bias the lever 62 in a counterclockwise direction. The over-travel spring 60 has a hooked end 86 extending through an opening 87 in the cage member 58 and has another hooked end 88 bearing on the innermost edge of a guide slot 89. The over-travel spring 60 is so constructed as to be prestressed to a minimum predetermined strength, which is greater than the strength of the lever return spring 64, when the over-travel spring is connected to the cage 58.

The end 88 of the spring 60 also extends through an opening 90 in the lever 62. Due to a counterclockwise biasing force exerted on the lever 62 by the return spring 64, the edge of the opening 90 engages the hooked end 88 of the spring 60 to maintain the cable 54 in a taut condition and to define a normally retracted position of the lever 62, since the over-travel spring 60 and the cable 54 will act as one member until the force on the over-travel spring is greater than the pre-stressed amount, which force will be not exceeded until application of the brake.

The over-travel feature does not form a part of the invention disclosed herein. For further details of the over-travel feature, reference may be made to copending U.S. applications Serial Numbers 280,661 and 322,658 filed on May 15, 1963 and November 12, 1963, respectively, which are also assigned to The Bendix Corporation.

In operation, assuming rotation of the brake drum in either direction, the shoes 12 and 14 will be spread by the wheel cylinder 60 into the brake drum 24 with the shoes anchoring on the anchor block 26 and adjusting screw 36. The movement of each shoe 12 and 14 will cause pulling by the cable 54 and the over-travel spring 60 on the lever 62 effecting rotation of the lever 62 about the pivot pin 72 and thus rotation of serrated wheel 44. There is a point during brake application wherein the force of the brake shoe 12 bearing on the adjusting screw 36 will be so great as to prevent further rotation of the sleeve 42 and the serrated wheel 44. This will happen while the brake shoes are moving and still effecting a pulling force by the cable 54 on the lever 62 to rotate the same. However, due to the pre-stressed over-travel spring 60, any further pulling force exerted by the cable will result in the cable 54 and the cage 58 moving relative to the lever 62 against the force of the over-travel spring 60, thereby preventing damage to the adjusting mechanism or breakage thereof when the adjusting screw and the sleeve 42 bind due to the anchoring force exerted thereon by the brake shoe 12. The arrangement of the over-travel spring 60, the cage 58 and the lever 62 does not form a part of this invention, but forms the subject matter of copending U.S. application Serial No. 280,661, filed on May 15, 1963, in the name of Burnett et al. and assigned to The Bendix Corporation (common assignee).

Rotation of the serrated wheel 44 causes rotation of the sleeve 42 and longitudinal movement of the adjusting screw 36 out of the counterbored opening 38. The adjusting screw 36 pushes the shoe 12 circumferentially around the brake drum towards the wheel cylinder.

Upon release of braking pressure in the wheel cylinder 60, the return spring 52 returns the brake shoes against the strut 50. The shoe 12 acts on the strut 50 at point 51 and the strut 50 reacts against the shoe 14 at point 53 to push the shoe 14 circumferentially around the brake drum against the fixed anchor 26. Thus, the new position of the brake shoe 12 is transmitted through the strut 50 to the brake shoe 14 to adjust the position of the brake shoe 14.

It should be noted that when a parking brake lever is utilized as shown in the embodiment of FIG. 1, no adjustment of the cable 92 leading to the parking brake lever 55 is necessary since the parking brake lever will always bear on the innermost edge of the slot 51 of the strut 50 regardless of the wear of the brake linings of the brake shoes, due to the shoes being biased into anchoring engagement with the strut 50 during brake released position.

Referring to the embodiment of FIG. 3, there is illustrated a view of the same type of brake assembly as that shown in FIG. 1, with the lever for actuating the serrated wheel being pivotally mounted on the web of the brake shoe. The elements which are similar to those in the embodiment of FIG. 1 are designated with the same reference numerals with an *a* affixed thereto.

A well known three-piece adjusting strut comprising an adjusting pivot nut 102 welded to the backing plate 10a, a rotatable adjustable screw 104, and a socket 106 is provided between the adjacent ends 32a and 34a of the brake shoes 12a and 14a, respectively. The pivot nut 102 and the socket 106 each have a slot receiving the webs 13a and 15a of the brake shoes 12a and 14a, respectively. The adjusting screw 104 has a serrated wheel 116 integral therewith which is adapted to be rotated by a lever 118 of an automatic brake adjusting mechanism. The lever 118 has a finger portion 120 adjacent the serrated wheel 116 to engage the same and rotate the same upon pivotal movement of the lever 118. The lever 118 has an elongated slot 122 through which a grooved pin 124, secured to the web 15a of the brake shoe 14a, extends and on which the lever 118 rotates. A combination lever return spring and over-travel spring 126 is extended between and attached at its ends to a projection 128 of the rim of the brake shoe 14a and the edge of the opening 130 of the lever 118 to exert a counterclockwise pivoting force on the lever 118. The arrangement of the combination lever return and over-travel spring 126 and the lever 118 on the shoe 14a does not form a part of this invention, but does form the subject matter of copending U.S. application Serial No. 322,658, filed on November 12, 1963 in the name of Edward K. Dombeck et al. and assigned to The Bendix Corporation (common assignee). A cable 54a has a hook 134 at one end which extends through an opening 136 of a flange 138 on the lever 118 and is maintained in a taut condition by the combination lever return and over-travel spring 126. A spring 48a interconnects shoe ends 32a and 34a to maintain the same in engagement with the adjusting pivot nut 102 and the socket 106, respectively.

Upon brake application, the cable 54a will pull on the lever 118 resulting in clockwise pivotal movement of the lever about the pin 124 and rotation of the serrated wheel 116. When the adjusting screw 104 binds due to the anchoring force of the shoe 14a thereon, any further pulling force exerted by the cable 54a will result in the lever 118 tending to pull away from its pivot pin 124 against the force of the combination return and over-travel spring 126 which prevents breakage or damage to the automatic adjusting mechanism.

While the automatic adjuster illustrated herein actuates during brake application, it is obvious that the embodiments could be modified so the adjuster will operate upon release of the brake.

Although this invention has been illustrated and described in connection with specific embodiments, numerous other adaptations of the invention will become apparent to those skilled in the art. We intend to include within the scope of the following claims all equivalent applications of the invention whereby the same or substantially the same results will be obtained.

I claim:
1. A drum brake comprising: a support member, a pair of brake shoe members disposed in end-to-end relationship on said support member, an anchor member fixed to said support member and disposed between a pair of adjacent ends of said brake shoe members, adjustable means carried by said anchor member and operatively connected to one of said adjacent shoe ends, said adjustable means comprising a rotatable element, a lever pivotally mounted on one of said members and having a portion engaging said rotatable element for rotating the same, force transmitting means operatively connected to said lever for rotating said lever, a rigid member extending between and operatively connected to each of said brake shoe members, resilient means urging said brake shoe members into anchoring engagement with said rigid member during brake release position, and actuating means disposed between the other pair of adjacent brake shoe ends.

2. The structure as recited in claim 1 wherein said force transmitting means comprises a cable, said cable being operatively connected at one end to said lever, at its other end to one of said brake shoe members, and intermediate its ends to the other of said brake shoe members.

3. The structure as recited in claim 2 wherein said lever is pivotally mounted on said anchor member.

4. The structure as recited in claim 2 wherein said lever is pivotally mounted on said other brake shoe member.

5. A brake comprising: a support, a pair of brake shoe members disposed in end-to-end relationship on said support, an anchor fixed to said support and disposed between a pair of adjacent ends of said brake shoes, adjustable means carried by said anchor and operatively connected to one of said adjacent shoe ends, said adjustable means comprising a rotatable element, a lever pivotally mounted on a stationary portion of the brake and having a portion engaging said rotatable element for rotating the same, force transmitting means operatively connected to said lever and to at least one of said brake shoes for effecting pivotal movement of said lever, a rigid member extending between and operatively connected to each of said brake shoes, resilient means urging said brake shoe members into anchoring engagement with said rigid member during brake release position, and actuating means disposed between the other pair of adjacent brake shoe ends.

6. The structure as recited in claim 5 wherein said force transmitting means comprises a cable member, said cable member being operatively connected at one end to said lever, at the other end to one of said brake shoe members, and intermediate its ends to the other of said brake shoe members.

7. A brake comprising: a support, a pair of brake shoes disposed in end-to-end relationship on said support, an anchor fixed to said support and disposed between a pair of adjacent ends of said brake shoes, adjustable means carried by said anchor and operatively connected to one of said adjacent shoe ends, said adjustable means comprising a rotatable element, a lever pivotally mounted on said anchor and having a portion engaging said rotatable element for rotating the same, force transmitting means operatively connected to said lever and to at least one of said brake shoes for effecting pivotable movement of said lever, a rigid member extending between and operatively connected to each of said brake shoe members, resilient means urging said brake shoe members into engagement with said rigid member during brake release position, and actuating means disposed between the other pair of adjacent brake shoe ends.

8. A brake comprising: a support member, a pair of brake shoe members disposed in end-to-end relationship on said support member, an anchor member fixed to said support and disposed between a pair of adjacent ends of said brake shoe members, adjustable means carried by said anchor member and operatively connected to one of said adjacent shoe ends, said adjustable means comprising a rotatable element, a lever pivotally mounted on one of said brake shoe members and having a portion engaging said rotatable element for rotating the same, force transmitting means operatively connected to said lever and to at least one of the other of said members for effecting pivotable movement of said lever, a rigid member extending between and operatively connected to each of said brake shoe members, resilient means urging said brake shoe members into engagement with said rigid member during brake release position, and actuating means disposed between the other pair of adjacent brake shoe ends.

9. A brake comprising: a support, a pair of brake shoes disposed in end-to-end relationship on said support, an anchor fixed to said support and disposed between a pair of adjacent ends of said brake shoes, adjustable means carried by said anchor and operatively connected to one of said adjacent shoe ends, said adjustable means comprising a rotatable element, a lever pivotally mounted on one of said brake shoes and having a portion engaging said rotatable element for rotating the same, force transmitting means operatively connected to said lever and to at least the other of said brake shoes for effecting pivotable movement of said lever, a rigid member extending between and operatively connected to each of said brake shoe members, resilient means urging said brake shoe members into engagement with said rigid member in brake release position, and actuating means disposed between the other pair of adjacent brake shoe ends.

10. A brake comprising: a support member; a pair of brake shoe members slidable on said support member; an anchor member fixed to said support member and disposed between one pair of adjacent ends of said brake shoe members; an externally threaded elongated element extending into said anchor member at the inner end thereof and having a slot at its outer end receiving one of said adjacent ends of said brake shoe members; a sleeve having an internally threaded inner portion extending into said anchor member and having a serrated wheel integral with its outer portion; said inner portion of said sleeve surrounding said inner end of said elongated element with the threads thereof mating with the threads of said elongated element; a lever pivotally mounted on one of said members having a portion engaging said serrated wheel for rotating the same; a cable secured at one end to one of said brake shoes, operatively connected intermediate its ends to the other of said brake shoes, and operatively connected at its other end to said lever for rotating the same; a rigid member extending between and operatively connected to said brake shoe members; means biasing said brake shoe members into anchoring engagement with said rigid member during brake release position; and actuating means disposed between the other adjacent ends of said brake shoe members.

References Cited by the Examiner

UNITED STATES PATENTS

| | | | |
|---|---|---|---|
| 1,954,540 | 4/34 | Sanford | 188—79.5 |
| 2,118,106 | 5/38 | Press | 188—79.5 |
| 3,010,544 | 11/61 | Dahle et al. | 188—79.5 |
| 3,016,990 | 1/62 | Towns. | |
| 3,034,602 | 5/62 | Bauman | 188—79.5 |
| 3,034,603 | 5/62 | Bauman | 188—79.5 |

FOREIGN PATENTS 612,360  11/48  Great Britain.

ARTHUR L. LA POINT, *Primary Examiner.*

DUANE A. REGER, *Examiner.*